United States Patent
Wolfeld et al.

(10) Patent No.: US 9,031,222 B2
(45) Date of Patent: May 12, 2015

(54) AUTOMATIC SUPERVISOR INTERVENTION FOR CALLS IN CALL CENTER BASED UPON VIDEO AND/OR SPEECH ANALYTICS OF CALLS

(75) Inventors: Jeffrey Wolfeld, Palo Alto, CA (US); Vijetha Vadlakonda, Sunnyvale, CA (US); Vaishali Mithbaokar, San Jose, CA (US); Kenneth G. Rehor, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 13/206,117

(22) Filed: Aug. 9, 2011

(65) Prior Publication Data

US 2013/0039483 A1 Feb. 14, 2013

(51) Int. Cl.
*H04M 3/00* (2006.01)
*H04M 5/00* (2006.01)
*H04M 3/51* (2006.01)

(52) U.S. Cl.
CPC *H04M 3/00* (2013.01); *H04M 3/51* (2013.01); *H04M 3/5175* (2013.01)

(58) Field of Classification Search
CPC . H04M 3/5175; H04M 2201/40; H04M 3/51; H04M 3/2227
USPC ............ 379/265.02, 265.03, 265.06, 265.07, 379/265.09
See application file for complete search history.

(56) References Cited

U.S. PATENT DOCUMENTS

| | | | |
|---|---|---|---|
| 5,299,260 A | 3/1994 | Shaio | |
| 5,535,256 A | 7/1996 | Maloney et al. | |
| 5,696,811 A | 12/1997 | Maloney et al. | |
| 5,818,907 A | 10/1998 | Maloney et al. | |
| 6,047,060 A | 4/2000 | Fedorov et al. | |
| 6,181,776 B1 | 1/2001 | Crossley et al. | |
| 6,263,049 B1 | 7/2001 | Kuhn | |
| 6,363,145 B1 | 3/2002 | Shaffer et al. | |
| 6,408,064 B1 | 6/2002 | Fedorov et al. | |
| 6,594,470 B1 | 7/2003 | Barnes et al. | |
| 6,600,821 B1 * | 7/2003 | Chan et al. | 379/265.07 |
| 6,603,854 B1 | 8/2003 | Judkins et al. | |
| 6,707,904 B1 | 3/2004 | Judkins et al. | |
| 6,724,887 B1 | 4/2004 | Eilbacher et al. | |
| 6,959,078 B1 * | 10/2005 | Eilbacher et al. | 379/265.03 |
| 7,120,880 B1 * | 10/2006 | Dryer et al. | 715/863 |
| 7,457,404 B1 | 11/2008 | Hession et al. | |
| 8,396,205 B1 * | 3/2013 | Lowry et al. | 379/265.12 |

(Continued)

OTHER PUBLICATIONS

Castel Communication, Castel Detect Real Time Voice Analysis Technology, Jul. 11, 2011, Youtube, https://www.youtube.com/watch?v=zULIZO_yCog.*

*Primary Examiner* — Nafiz E Hoque
(74) *Attorney, Agent, or Firm* — Edell, Shapiro & Finnan, LLC (57) ABSTRACT

A method, a system and computer readable storage media facilitate establishing a plurality of simultaneously occurring communication sessions between call agent devices and customer devices at a call center communication system. Each communication session is monitored to determine a priority score associated with each communication session, where each priority score provides an indication of a potential problem associated with the corresponding communication session. An indication of the priority score associated with each communication session is provided to a supervisor device.

18 Claims, 4 Drawing Sheets

(56) References Cited

U.S. PATENT DOCUMENTS

| | | |
|---|---|---|
| 2001/0012345 A1 | 8/2001 | Nolting et al. |
| 2001/0014143 A1 | 8/2001 | Kuhn |
| 2001/0043697 A1 | 11/2001 | Cox et al. |
| 2005/0114379 A1* | 5/2005 | Lee .............................. 707/102 |
| 2005/0163305 A1* | 7/2005 | Jerijian et al. ........... 379/265.06 |
| 2005/0286705 A1 | 12/2005 | Contolini et al. |
| 2006/0233347 A1 | 10/2006 | Tong et al. |
| 2008/0151038 A1* | 6/2008 | Khouri et al. .............. 348/14.01 |
| 2009/0153646 A1* | 6/2009 | Bourguignon et al. .... 348/14.11 |
| 2010/0246800 A1* | 9/2010 | Geppert et al. .......... 379/265.09 |

\* cited by examiner

AUTOMATIC SUPERVISOR INTERVENTION FOR CALLS IN CALL CENTER BASED UPON VIDEO AND/OR SPEECH ANALYTICS OF CALLS

TECHNICAL FIELD

The present disclosure relates to call centers in which supervisors are capable of monitoring and managing multiple calls between customers and call agents.

BACKGROUND

Call centers are typically provided by companies to facilitate customer service communications between call agents and customers regarding a particular product or service provided by a company. In addition, it is common for one or more supervisors to randomly monitor calls between customers and call agents to ensure an appropriate level of customer satisfaction is maintained (e.g., to ensure a call agent is handling the communication properly and providing the customer with an adequate level of customer service, and to assist in training a call agent in properly handling communications between customers).

It can be difficult and burdensome for a call center supervisor to monitor multiple communications between call agents and customers, particularly during periods in which there is a high volume of communications at a call center.

DESCRIPTION OF EXAMPLE EMBODIMENTS

Overview

A method, a system and computer readable storage media are provided to facilitate establishing of a plurality of simultaneously occurring communication sessions between call agent devices and customer devices at a call center communication system. Each communication session is monitored to determine a priority score associated with each communication session, where each priority score provides an indication of a potential problem associated with the corresponding communication session. An indication of the priority score associated with each communication session is provided to a supervisor device.

Example Embodiments

Figure 1:
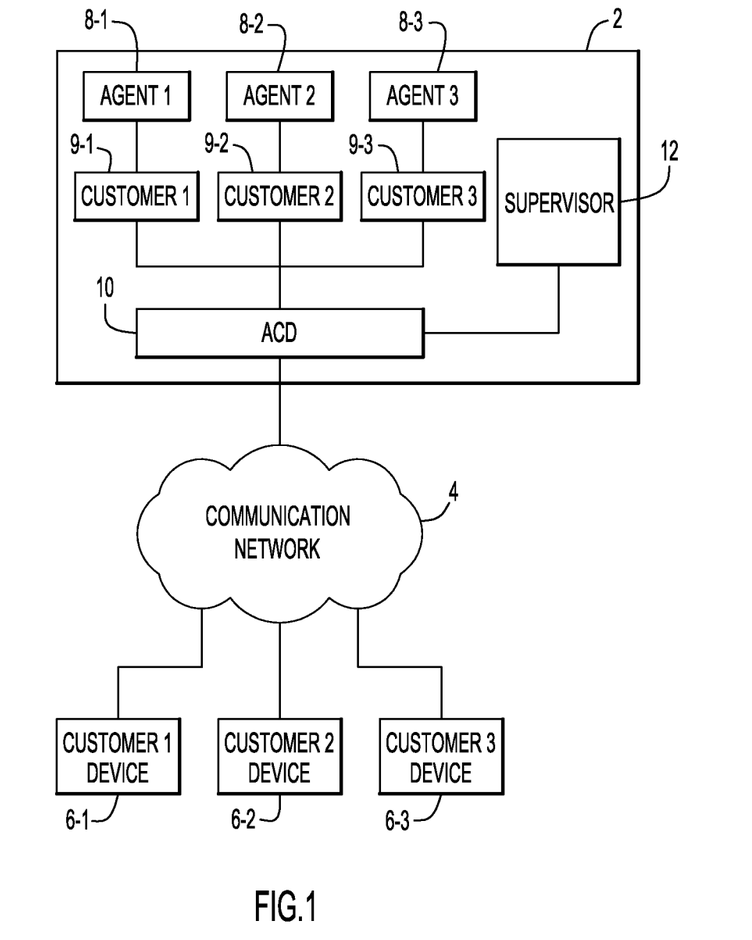
FIG. 1 is a schematic block diagram of an example call center communication system that facilitates multiple communications between call agents and customers simultaneously and further facilitates automatic monitoring of communications as well as notification to a supervisor of a scoring of problematic communications.

Referring to FIG. 1, a block diagram is shown for an example call center communication system 2 that facilitates multiple communications between customers and call agents simultaneously, with controlled monitoring of communications by one or more supervisors. The system 2 communicates with various customer devices 6 over a communication network 4 (depicted as a network cloud). As shown in FIG. 1, three customer devices 6, namely customer device 6-1 (Customer 1), customer device 6-2 (Customer 2) and customer device 6-3 (Customer 3), are engaged in communications with corresponding agent communication devices 8 (e.g., Agent Device 8-1, Agent Device 8-2 and Agent Device 8-3) of the call center system 2 via the network 4. It is noted that the number of agent devices is provided for illustrative purposes only; the call center system is not limited to this number and may facilitate any suitable number of simultaneous communications (e.g., hundreds or even thousands of simultaneous communications) between customer devices and agent devices at the system 2.

The communication network 4 can be any suitable telecommunications network that facilitates transmission of information, including audio and/or video stream components or portions, between two or more customer devices 6-1, 6-2 and 6-3 and the system 2. Examples of suitable types of networks that can be utilized include, without limitation, wired and wireless local or wide area networks, Internet Protocol (IP) networks such as intranet or the Internet, telephone networks (e.g., public switched telephone networks), wireless (mobile phone or cellular) networks, and any suitable combinations thereof.

Each customer device 6-1, 6-2 and 6-3 and each agent device 8 can be any suitable device that is configured to engage in audio and/or video communications between the customers and the call agents utilizing the system 2. Some examples of devices that can be used include, without limitation, stationary (e.g., desktop) computers, personal mobile computer devices such as laptops, note pads, tablets, personal data assistant (PDA) devices, and other portable media player devices, cell phones (e.g., Smartphones) including cameras and video display screens, and stationary (e.g., land line) phones including cameras and video display screens. The customer devices 6 and the agent devices 8 can utilize any suitable operating systems (e.g., Android, Windows, Mac OS, Symbian OS, RIM Blackberry OS, Linux, etc.) to facilitate operation, use and interaction between customers and call agents over the communication network 4 with the system 2.

Each call agent device 8-1, 8-2, and 8-3 is connected to an automatic call distributor 10. The automatic call distributor 10 assigns a customer contacting the contact center system 2 to an agent, as generally represented in FIG. 1 at block 9-1 (associated with Customer 1), block 9-2 (associated with Customer 2) and block 9-3 (associated with Customer 3), each being connected with a corresponding Agent Device 8-1, 8-2, 8-3. The automatic call distributor 10 is also connected to one or more supervisor devices, indicated generally as supervisor device 12 as shown in FIG. 1. Each supervisor device 12 can be of the same or similar type(s) as those described above for the agent devices 8-1, 8-2 and 8-3. The customer devices 6-1, 6-2 and 6-3, agent devices 8-1, 8-2 and 8-3 and each supervisor device 12 facilitate communication sessions that can include audio stream components (e.g., phone calls between customers and call agents) and also video stream components (e.g., video conference calls between customers and call agents).

The automatic call distributor 10 is configured to receive communication requests (e.g., a phone call or a video communication request) over the network 4 from customer devices 6-1, 6-2 and 6-3 and routes each communication request to a corresponding one of the agent devices 8-1, 8-2 and 8-3 as shown in FIG. 1. The automatic call distributor 10 also facilitates monitoring of some or all of the established communication connections between customers and call agents by the supervisor device 12. In addition, as described in further detail below, the automatic call distributor 10 prioritizes or scores communications based upon certain algorithms so as to provide a supervisor with the option of monitoring one or more communications that may be of greater concern.

Figure 2:
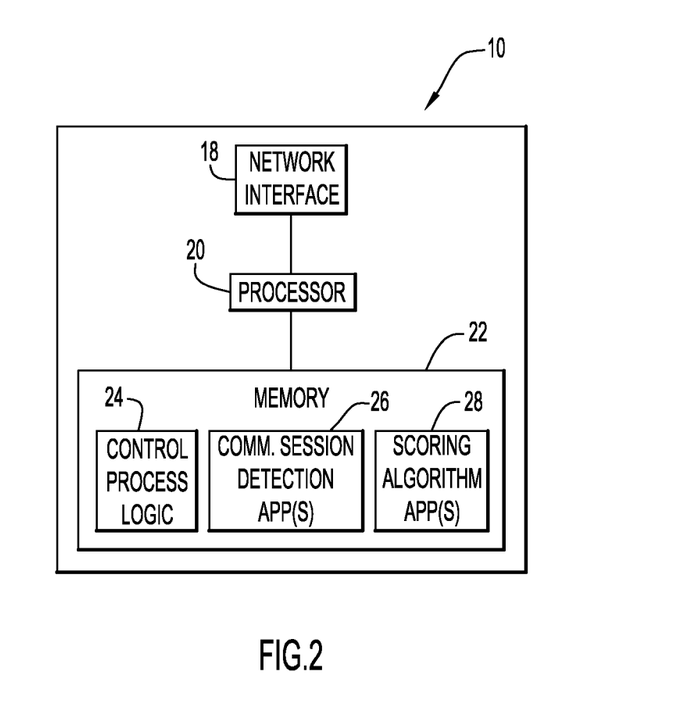
FIG. 2 is a schematic block diagram of an example embodiment for an automatic call distributor for the call center communication system of FIG. 1.

Referring to FIG. 2, the automatic call distributor 10 includes a network interface unit 18, a processor 20, and a memory 22. The network interface unit 50 can be any suitable hardware device that facilitates a connection with the communication network 4. The processor 20 is a microprocessor or microcontroller that executes control process logic instructions 24 (e.g., operational instructions and/or other software applications) stored in memory 22. The memory 22 can include random access memory (RAM) or a combination of RAM and read only memory (ROM), magnetic disk storage media devices, optical storage media devices, flash memory devices, electrical, optical, or other physical/tangible memory storage devices. The processor 20 executes the control process logic instructions 24 stored in memory 22 for controlling the automatic call distributor 10 and corresponding operating functions of the call center system 2, including automatic assignment of incoming communications from customer devices 6-1, 6-2 and 6-3 with corresponding agent devices 8-1, 8-2 and 8-3, providing an interface for facilitating monitoring and selective participation by each supervisor device 12 in any of the agent/customer communication sessions, prioritizing/scoring of communication sessions and also the performance of all other operations as set forth in the flowchart of FIG. 3. In general, the memory 20 may comprise one or more tangible computer readable storage media (e.g., a memory device) encoded with software comprising computer executable instructions and when the software is executed (by the processor 20) it is operable to perform the operations described herein in connection with control process logic instructions 24.

In addition, memory 22 also includes one or more communication session detection applications 26 and one or more scoring algorithm applications 28. The communication session detection applications 26 include any suitable types of software applications that are capable of identifying portions of audio and/or video from and/or other information associated with a communication session between each customer and corresponding call agent that indicate a potential problem associated with the communication session (e.g., where one or both of the customer and call agent are upset or angry during the communication session). For example, the communication session detection applications 26 can include any one or more detection software features including, without limitation: (1) speech recognition software to detect any selected number of words and/or phrases that may be associated with a problematic communication session when any person associated with a communication session is upset or angry, including a frequency detection feature that detects the frequency with which certain identifiable words or phrases are used in a communication session (e.g., where a greater frequency of use of certain words/phrases may provide a more likely indication of a problematic communication session); (2) voice volume and pitch detection software to detect when any person associated with a communication session may have a change in emotion such as becoming upset or angry (e.g., when volume and/or pitch levels increase above one or more threshold values, where such threshold value(s) can be determined based upon historical audio data associated with the communication session and/or any other communication sessions); (3) video detection software that can identify a human face associated with the customer and/or call agent and an identifiable change in facial expressions of the detected face (e.g., smile detection, frown detection and/or other facial expression detection) or color/tone of the detected face (e.g., a detection of a flush face of the call agent or the customer) that may occur during the communication session; (4) video detection software that can identify a frequency of movement or spatial displacement of the head and/or other body parts (e.g., arms or hands) of the call agent and/or the customer during the communication session that can be interpreted as agitated gestures indicative of an upset, angry or irritated person; and (5) a customer identifier database, including a history of communication sessions and other information associated with each known customer (e.g., information identifying a particular customer associated with a particular communication session as having one or more previous communication sessions at the system 2 that have been previously identified as problematic).

The communication session detection applications 26 can utilize any suitable (now known or hereinafter developed) types of detection software, such as face detection software that is capable of detecting a human face within one or more video frames of the video stream component or portion of each communication session, where the face detection software utilizes object-class detection and face localization techniques (e.g., based upon known techniques for identification of a head within an image, detection of eye structures, identification of nose structures, identification of distance between eye structures and nose structures, identification of mouth structures, etc.). The face detection software can be utilized to detect facial expressions, such as smiles or frowns on a human face, as well as physical gestures with the face and other identifiable body portions within the video frames (e.g., arm or hand movements) that may be indicative of an agitated, angry or upset person.

Thus, the communication session detection applications 26 provide an automatic indication of whether anyone (i.e., call agent and/or customer) associated with a particular communication session may be angry, upset or agitated which in turn provides an indication of a potentially problematic communication session.

The scoring algorithm applications 28 may provide one or more algorithms utilized by the processor 20 to automatically determine the probability or degree to which any communication session between a customer and a call agent is potentially problematic and to further prioritize or rank/score each current communication session at any given time based upon the determined problematic degrees for each session. As described above, a problematic communication session refers to a communication session in which one or both of the customer and call agent associated with the session may be angry, upset or agitated in some manner. Each scoring algorithm application utilizes the information obtained by one or more communication session detection applications 26 to score the communication sessions based upon degree to which each may be a problematic communication session.

For example, if the frequency of identified problematic words or phrases utilized by the customer or call agent for a particular communication session is at or above a certain threshold value, a communication session detection application 26 will provide an indicator that it may be a problematic communication session (e.g., the indicator value may be based upon the degree to which the frequency of identified problematic words or phrases exceeds a threshold value). A scoring algorithm application 28 will utilize this information to determine the degree to which the session may be problematic in relation to other communication sessions occurring at the same time within the system 2 by comparing with information obtained from one or more communication session detection applications 26 associated with other on-going communication sessions. For example, if the frequency of identified problematic words/phrases for one on-going communication session is greater than that for another on-going communication session, the communication session with the greater frequency of identified problematic words/phrases can have a greater score and thus a higher rank in comparison with the other communication session.

Scoring can also be determined by the scoring algorithm applications 28 for each on-going communication session based upon information obtained from a combination of different factors as determined by two or more communication session detection applications 26. For example, it may be automatically determined that a first on-going communication session qualifies as a potentially problematic call based upon indicators provided by two or more communication session detection applications 26 (e.g., based upon a threshold frequency being established for identified problematic words/phrases occurring within the communication session, based upon a volume/pitch level being greater than a threshold level for the communication session, and/or based upon any other indicators determined by other communication session detection applications 26), whereas a second on-going communication session either does not qualify as a potentially problematic call (e.g., no indicators as determined by the communication session detection applications 26) or qualifies as a potentially problematic call but with fewer indicators or with indicators having smaller indicator values (e.g., a volume/pitch level or value of the second on-going communication session is less than the volume/pitch level or value of the first on-going communication session) as provided by one or more communication session detection applications 26 in comparison to the first on-going communication session. In this scenario, the first on-going communication session would be ranked higher in priority in relation to the second on-going communication session. In a further example scenario, a customer associated with a communication session may be identified by the customer identifier database as a routine problematic caller, and this can raise the priority score for this communication session to a selected level. Each of the different types of communication session detection applications 26 as noted above can provide an indication value that can be scored by the scoring algorithm applications 28.

Further, the scoring algorithm applications 28 can set different prioritizations or different weighted values to indicators provided by different communication session detection applications 26 which identify different audio and/or video cues during an on-going communication session. For example, a volume/pitch audio indicator provided by one communication session detection application 26 can be provided with a greater priority or weighted value in relation to an indicator value provided by another communication session detection application 26 that detects rapid or frequent movements of body parts of the customer and/or agent associated with a particular communication session. Other types of audio or video cues can also be weighted differently. The combination of different weighted values can be combined to obtain a rank or priority score for a particular communication session.

The selection of weighted values for different types of detection indicators by different communication session detection applications 26 can initially be set manually (e.g., by a system administrator or a supervisor) or automatically (e.g., by the automatic call distributor 10). The system can be configured to allow the supervisor to adjust such weighted values at any time based upon supervisor preference.

In an example embodiment, during system operation the automatic call distributor 10 can gradually "learn" for each supervisor which types of indicators may be of greater interest to a supervisor. For example, the distributor 10 can be configured to start with initial weightings of different detection indicators, and provide a rank or priority score for each communication session which is being monitored by a supervisor. Based upon a history of communication sessions that the supervisor selects for closer monitoring, the distributor 10 can analyze the weighted values associated with such communication sessions and adjust such weighted values accordingly. For example, if a supervisor continuously selects communication sessions for closer monitoring which involve a selected frequency of hand gesticulations by the agents and/or the customers associated with such communication sessions (e.g., 70% or more of the communications sessions selected by the supervisor have a frequency of hand gesticulations (gestures) that is above a certain threshold), the indicator values provided by the communication session detection application(s) 26 that detect such hand gesticulations can be weighted to a greater extent in comparison with other indicator values, such that communication sessions in which such hand gesticulations are detected may generate a greater rank or priority value due to the adjustment in the weighting of the hand gesticulation indicator values.

Based upon the variety of different comparisons as described above, a rank or scoring of each on-going or currently pending communication session can be determined, and this information provides a determination of which communication sessions are at greater risk and should be prioritized at a higher level for monitoring by a supervisor.

Figure 3:
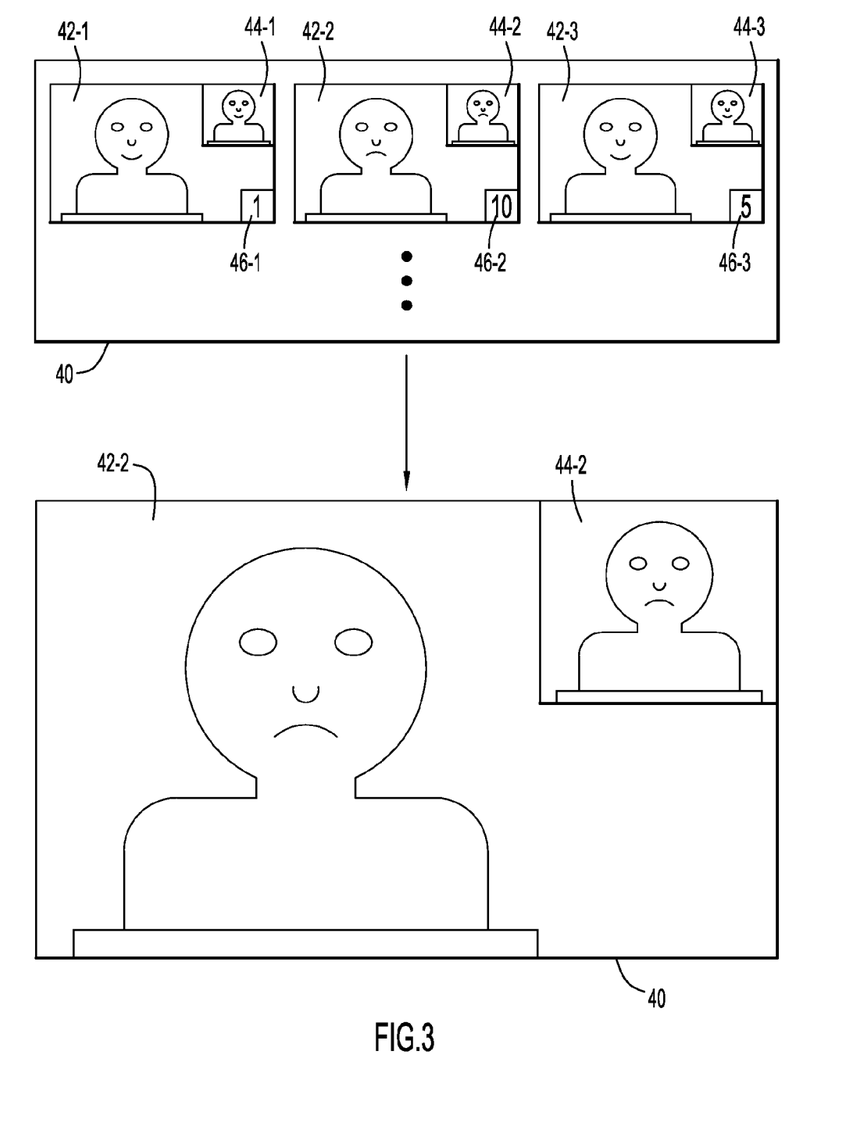
FIG. 3 is an example display associated with a supervisor device of the call center communication system of FIG. 1 which allows a supervisor to monitor various communication sessions occurring simultaneously between call agents and customers.

Each supervisor device 12 includes a suitable display to monitor communication sessions for each agent under the supervisor. As depicted in FIG. 3, a display 40 (e.g., a video monitor such as an LCD display screen) for supervisor device 12 includes a plurality of video windows 42 that display each on-going or currently pending communication session. For example, video window 42-1 displays an on-going communication session between Agent 1 and Customer 1, video window 42-2 displays an on-going communication session between Agent 2 and Customer 2, etc. While only three communication sessions are depicted in FIG. 3, the system 2 supports any number of communication sessions that can be simultaneously monitored on display 40 by a supervisor device 12.

Each video window 42 shows a video image of the customer and a picture-in-picture (PIP) window 44 in an upper corner of each video window 42 that shows a video image of the agent engaging in the communication session with that customer. Thus, the display 40 provides an example embodiment of monitoring video communication sessions between agents and customers by a supervisor. In another embodiment in which the communication sessions are phone calls (i.e., only audio stream component information is provided for customers during the communication sessions), a video display 40 can still be provided for the supervisor in order for the supervisor to selectively monitor facial expressions, movements, etc. of each call agent (in order to assess whether there may be a problematic communication session based upon call agent appearance). In such scenarios, the video windows 42 would only show video images of the call agents (i.e., there are no PIP windows 44 within windows 42).

A priority score 46 can also be provided in each window 42, where the priority score 46 provides the score as determined by the one or more scoring algorithm applications 28 that are applied to each on-going communication session (where the scoring algorithm application(s) 28 determine the priority scores based upon indicators as determined by the communication session detection applications 26). In the example embodiment, window 42-1 has a priority score 46-1 of "1" assigned to it, while window 42-2 has a priority score 46-2 of "10" assigned to it and window 42-3 has a priority score 46-3 of "5" assigned to it. The priority score 46 for each window 42 can change at any time during the communication session associated with the window, based upon the automatic monitoring performed by the communication session detection applications 26 and the automatic scoring that is continuously updated by the scoring algorithm applications 28. As described in further detail below, at any selected time (either performed automatically by the system 2 or manually by the supervisor), the display 40 can be converted to only showing a single window 42 along with its contents (e.g., a display of the window 42 having the greatest priority score 46). As further described below, the audio stream component or portion associated with this communication session can also be monitored by the supervisor.

Figure 4:
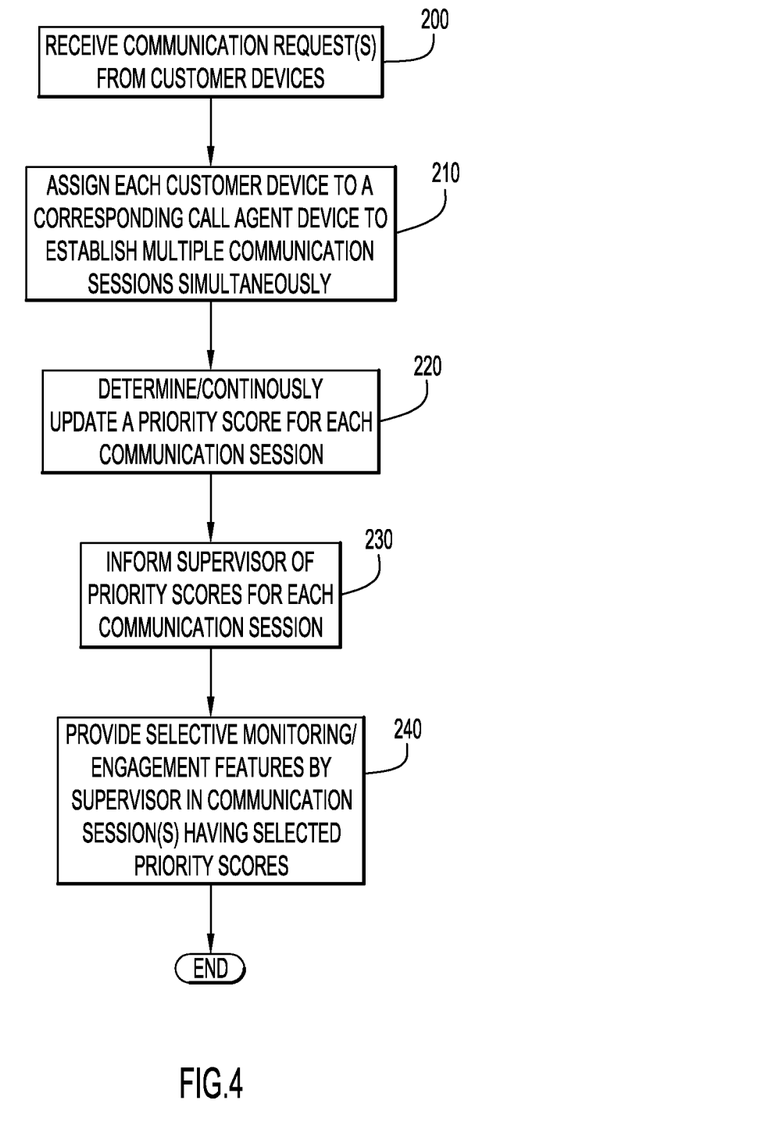
FIG. 4 is a flow chart that depicts an example process for operating the system of FIG. 2 to perform the automatic scoring of customer to call agent communications to provide a supervisor with an indication of which communications to monitor during any given time period.

Operation of the call center communication system 2 is now described with reference to the flowchart of FIG. 4. At 200, communication requests are received from customer devices 6-1, 6-2, 6-3 over the communication network 4 by the automatic call distributor 10, where customers are requesting a communication session (e.g., a phone call or a video conferencing communication) with a call agent at the call center communication system 2. At 210, the automatic call distributor 10 assigns each customer device 6 requesting a communication session with a corresponding one of the call agent devices 8-1, 8-2 and 8-3 (as indicated by blocks 9-1, 9-2 and 9-3 shown in FIG. 1), such that a plurality of communication sessions between call agents and customers are simultaneously established and concurrently processed by the system 2.

Each communication session between call agent and customer is automatically and continuously monitored by the automatic call distributor 10, utilizing the communication session detection applications 26 and scoring algorithm applications 28, and a priority score is assigned to each communication session at 220. The priority score for each communication session is further continuously updated based upon the monitoring of each communication session by the automatic call distributor 10 (e.g., based upon different detection indicator values and/or changes in weightings of such values as described above). For example, in video conference communication sessions, the automatic call distributor 10 continuously monitors both the audio and video stream portions for each communication session and, when necessary, adjusts the priority score for each communication session. In phone calls in which there is only an audio stream portion for a customer associated with the communication session, the automatic call distributor 10 continuously monitors the audio stream portions of the communication session and, in the optional scenario in which there is a video stream portion for the call agent, the distributor 10 also continuously monitors the video frames of the call agent. In an example scenario, a communication session might begin with a low priority score as determined by the distributor 10 (due to the communication session detection applications 26 determining there is a low threshold likelihood of a problematic communication session). However, the priority score may increase to a higher priority score during the progression of the communication session (e.g., volume/pitch in the audio stream portion and associated with the conversation between the call agent and the customer increases above a threshold level during the communication session; video stream portion indications change during the communication session, such as detection of negative facial expressions (e.g., frowning), high frequency of movement of head, arms and/or hands and/or other detections providing an indication that the call agent and/or customer has become upset, angry or agitated, etc.). The automatic call distributor 10 continuously updates the priority score based upon the continuous monitoring for each communication session.

At 230, a supervisor is informed and continuously updated by the automatic call distributor 10 with priority scores associated with each communication session that has been assigned to call agents under the supervisor. In the example embodiment depicted in FIG. 3, in which video conference communication sessions occur between customer devices 6 and call agent devices 8, the display 40 of the supervisor device 12 includes video windows 42 for each communication session, where each window 42 shows a customer associated with a customer device 6, a PIP video window 44 showing the call agent associated with the corresponding agent device 8, and a priority score 46 associated with this communication session. As previously noted, each priority score 46 is continuously updated by the distributor 10 during the progression of the corresponding communication session.

At 240, the supervisor can engage in selective monitoring of the communication sessions assigned to the call agents of the supervisor by viewing the various windows 42 of the display 40. This can be done without the supervisor listening to the audio stream (i.e., the verbal conversation) between call agent and customer for each communication session, since attempting to simultaneously listen to multiple audio streams associated with more than one conversation is difficult and impractical. However, the supervisor can quickly scan each window 42 with relative ease, while also scanning the priority score 46 provided for each window 42. In an alternative scenario in which phone calls are monitored by a supervisor and there is no video stream component or portion associated with customers, a display for the supervisor device 12 can be provided that shows priority scores for each communication session and, optionally, video stream portions for the call agents associated with the communication sessions. Thus, a display similar to that shown in FIG. 3 can also be provided for phone call distribution centers to allow a supervisor to rapidly scan the display for potentially problematic phone calls based upon the priority score associated with each phone call and/or a visual observation of the facial expressions or other behavior of each call agent.

The supervisor device 12 provides the option for the supervisor to select one of the communication sessions, by selecting a window 42 from display 40, that the supervisor believes may be problematic (e.g., as indicated by the priority score 46 associated with a window 42 and/or by the supervisor observing the visual expressions and actions of each of the call agent and customer as displayed within a window 42). In an example embodiment, the display 40 can provide a graphical user interface that allows the supervisor to select a window 42 by highlighting it (e.g., using a peripheral device such as a mouse pointer to point and click upon a window 42, or by providing the display 40 as a touch screen that allows the supervisor to touch and highlight a particular window 42 of interest). By selecting a window 42 of interest, the window 42 can fill the entire display 40. For example, as shown in FIG. 3, window 42-2 is selected for close monitoring by the supervisor (e.g., due to the priority score 46 being greater than that for windows 42-1 and 42-3). Alternatively, or in addition to the feature of the supervisor manually selecting a particular communication session to monitor, the automatic call distributor 10 can automatically select a window 42 (such as window 42-2 as shown in FIG. 3) corresponding with a communication session to be closely monitored by the supervisor. The automatic selection of a window 42 can be based upon the communication session associated with the window 42 reaching an upper threshold priority score value or reaching an undesirable priority score value that exceeds other priority score values by a predetermined amount.

When a window 42 is selected manually by the supervisor or automatically by the distributor 10, the audio stream portion of the communication session is output by the supervisor device 12 in addition to displaying the video stream portions on the display 40 showing the call agent and the customer. This allows the supervisor to focus on or closely monitor one potentially problematic communication session. The supervisor device 12 can further be connected to the communication session with the agent device 8 and the customer device 6 so as to allow the supervisor to engage in the conversation and interact with the call agent and the customer. At any time during such close monitoring of a particular communication session, the supervisor can selectively change the display 40 back to the previous series of windows 42 showing the various communication sessions between call agents and customers as shown in FIG. 3. In addition, the automatic call distributor 10 is prevented from automatically switching the supervisor device 12 and display 40 to another communication session window 42 that may suddenly have a greater priority score 46 than the priority score 46 associated with the communication session the supervisor is currently closely monitoring. However, the distributor 10 can provide an indication (e.g., a text box within the window 42) that another communication session is potentially problematic and needing of supervisor attention while the supervisor is engaged and closely monitoring another communication session.

Thus, the methods and corresponding systems and/or apparatuses described herein facilitate a ranking or prioritization of potentially problematic communication sessions for a plurality of communication sessions occurring simultaneously in a call distribution system environment. This provides a mechanism for allowing a supervisor to quickly scan the communication sessions and identify potentially problematic communication sessions, based upon a priority score assigned to each communication session. In addition, an automatic determination can be made by the system regarding which communication session may be the most problematic, based upon an assessment of the priority scores, and such communication session can be brought to the attention of a supervisor (by providing the audio and/or video feed streams as output to the supervisor device).

The above description is intended by way of example only.

What is claimed is:

1. A method comprising:
   establishing a plurality of simultaneously occurring communication sessions between call agent devices and customer devices at a call center communication system;
   monitoring each communication session to determine a priority score associated with each communication session, wherein each priority score is determined based upon at least one scoring algorithm that utilizes information obtained from the monitoring of each communication session such that each priority score provides an indication of a potential problem associated with the corresponding communication session; and
   providing an indication of the priority score associated with each communication session to a supervisor device, wherein an indication of the priority score associated with each communication session is provided to the supervisor device via a display, the display including a plurality of windows with each window being associated with a corresponding communication session, and each window further including the priority score associated with the corresponding communication session;
   wherein at least one window further includes a picture-in-picture video image that includes images of a call agent and a customer associated with the corresponding communication session, and the monitoring of the corresponding communication session to determine a priority score includes monitoring the video image in the at least one window to identify changes in facial expressions of the call agent or the customer.

2. The method of claim 1, further comprising:
   automatically providing supervisor access to a communication session between a call agent and a customer and having a priority score that exceeds a predetermined value.

3. The method of claim 1, wherein the monitoring of each communication session comprises monitoring audio and video stream components associated with each communication session.

4. The method of claim 1, wherein the indication of the priority score for each window comprises a numerical value.

5. The method of claim 1, further comprising:
   providing supervisor access to a communication session between a call agent and a customer by selecting a window of the display utilizing the supervisor device.

6. The method of claim 5, further comprising:
   in response to selecting a window of the display utilizing the supervisor device, displaying a larger version of the selected window comprising a video image of at least one of the customer and the call agent on the display and outputting an audio stream component of the communication session between call agent and customer to the supervisor device.

7. A system comprising:
   a plurality of call agent devices, each call agent device configured to engage in a communication session with a customer device via a communication network;
   a supervisor device configured to monitor communication, wherein the supervisor device includes a display; and
   an automatic call distributor comprising a processor configured with logic to execute and control operations for:
      establishing a plurality of simultaneously occurring communication sessions between call agent devices and customer devices;
      monitoring each communication session to determine a priority score associated with each communication session, wherein each priority score is determined based upon at least one scoring algorithm that utilizes information obtained from the monitoring of each communication session such that each priority score provides an indication of a potential problem associated with the corresponding communication session; and
      providing an indication of the priority score associated with each communication session to the supervisor device;

wherein the processor is configured to:
provide an indication of the priority score associated with each communication session to the display of the supervisor device such that the display includes a plurality of windows with each window being associated with a corresponding communication session, and each window further including the priority score associated with the corresponding communication session; and
provide a picture-in-picture video image in at least one window that includes images of a call agent and a customer associated with the corresponding communication session, such that the monitoring of the corresponding communication session to determine a priority score includes monitoring the video image in the at least one window to identify changes in facial expressions of the call agent or the customer.

8. The system of claim 7, wherein the processor is further configured with logic to automatically provide supervisor access to a communication session between a call agent and a customer and having a priority score that exceeds a predetermined value.

9. The system of claim 7, wherein each call agent device is configured to conduct a communication session with a corresponding customer device that includes audio and video stream components, and the processor is configured to monitor the audio and video stream components associated with each communication session.

10. The system of claim 7, wherein the indication of the priority score for each window comprises a numerical value.

11. The system of claim 7, wherein the processor is further configured to provide supervisor access to a communication session between a call agent and a customer by selecting a window of the display utilizing the supervisor device.

12. The system of claim 11, wherein, in response to selection of a window of the display utilizing the supervisor device, the processor is configured to display a larger version of the selected window comprising a video image of at least one of the customer and the call agent on the display and output an audio stream component of the communication session between call agent and customer to the supervisor device.

13. One or more computer readable storage devices encoded with software comprising computer executable instructions and when the software is executed operable to:
establish a plurality of simultaneously occurring communication sessions between call agent devices and customer devices at a call center communication system;
monitor each communication session to determine a priority score associated with each communication session, wherein each priority score is determined based upon at least one scoring algorithm that utilizes information obtained from the monitoring of each communication session such that each priority score provides an indication of a potential problem associated with the corresponding communication session; and
provide an indication of the priority score associated with each communication session to a supervisor device, wherein an indication of the priority score associated with each communication session is provided at a display of the supervisor device such that the display includes a plurality of windows with each window being associated with a corresponding communication session, and each window further including the priority score associated with the corresponding communication session;
wherein at least one window further includes a picture-in-picture video image that includes images of a call agent and a customer associated with the corresponding communication session, and the monitoring of the corresponding communication session to determine a priority score includes monitoring the video image in the at least one window to identify changes in facial expressions of the call agent or the customer.

14. The one or more computer readable storage devices of claim 13, and further comprising instructions that are operable to automatically provide supervisor access to a communication session between a call agent and a customer and having a priority score that exceeds a predetermined value.

15. The one or more computer readable storage devices of claim 13, wherein the monitoring of each communication session comprises monitoring audio and video stream components associated with each communication session.

16. The one or more computer readable storage devices of claim 13, wherein the indication of the priority score for each window comprises a numerical value.

17. The one or more computer readable storage devices of claim 13, and further comprising instructions that are operable to control operations of the supervisor device so as to provide supervisor access to a communication session between a call agent and a customer by selecting a window of the display utilizing the supervisor device.

18. The one or more computer readable storage devices of claim 17, and further comprising instructions that are operable to control operations of the supervisor device such that, in response to selection of a window of the display utilizing the supervisor device, a larger version of the selected window comprising a video image of at least one of the customer and the call agent is displayed and an audio stream component of the communication session between call agent and customer is output by the supervisor device.

* * * * *